United States Patent
Sudheendra et al.

(10) Patent No.: US 11,257,035 B2
(45) Date of Patent: Feb. 22, 2022

(54) SPLITTING A TASK HIERARCHY

(71) Applicant: SAP SE, Walldorf (DE)

(72) Inventors: Krishna Hindhupur Vijay Sudheendra, Bangalore (IN); Hari Babu Krishnan, Bangalore (IN); Nithya Rajagopalan, Bangalore (IN); Prasanna Kumar Govindappa, Bangalore (IN); Avneesh Sharma, Gola Gokarannath (IN)

(73) Assignee: SAP SE, Walldorf (DE)

( * ) Notice: Subject to any disclaimer, the term of this patent is extended or adjusted under 35 U.S.C. 154(b) by 181 days.

(21) Appl. No.: 16/126,619

(22) Filed: Sep. 10, 2018

(65) Prior Publication Data

US 2020/0082000 A1 Mar. 12, 2020

(51) Int. Cl.
*G06Q 10/08* (2012.01)
*G06F 3/0482* (2013.01)
*G06Q 10/06* (2012.01)
*G06Q 30/06* (2012.01)

(52) U.S. Cl.
CPC ....... *G06Q 10/0875* (2013.01); *G06F 3/0482* (2013.01); *G06Q 10/06311* (2013.01); *G06Q 30/0635* (2013.01); *G06Q 30/0633* (2013.01)

(58) Field of Classification Search
CPC .......... G06Q 10/06311; G06Q 30/0633; G06F 16/185; G06F 16/3323; G06F 3/0482; G06N 20/00
See application file for complete search history.

(56) References Cited

U.S. PATENT DOCUMENTS

| | | | | |
|---|---|---|---|---|
| 4,862,376 A | * | 8/1989 | Ferriter | G06T 17/00 700/107 |
| 4,875,162 A | * | 10/1989 | Ferriter | G06Q 10/0875 705/29 |
| 5,119,307 A | * | 6/1992 | Blaha | G06Q 10/087 700/107 |
| 5,796,614 A | * | 8/1998 | Yamada | G06Q 10/0875 700/106 |
| 5,893,074 A | * | 4/1999 | Hughes | G06Q 10/06313 705/80 |
| 6,073,108 A | * | 6/2000 | Peterson | G06Q 10/06311 705/7.23 |
| 6,101,481 A | * | 8/2000 | Miller | G06Q 10/10 705/7.13 |

(Continued)

*Primary Examiner* — Kavita Stanley
*Assistant Examiner* — Tyler Schallhorn
(74) *Attorney, Agent, or Firm* — Mintz Levin Cohn Ferris Glovsky and Popeo, P.C.

(57) ABSTRACT

In one aspect, there is provided a method including presenting a first user interface including an object hierarchy comprising a parent node and a plurality of child nodes; receiving, at a second user interface, a first selection allocating at first portion of the object hierarchy to a first device; receiving, at the second user interface, a second selection allocating a second portion of the object hierarchy to a second device; and when a selection at a user interface element of a third user interface is received, sending an indication to a system to enable generation of a fourth user interface presenting a first electronic document for the first device and generation of a fifth user interface presenting a second electronic document for the second device. Related systems, methods, and articles of manufacture are also disclosed.

15 Claims, 10 Drawing Sheets

(56) References Cited

U.S. PATENT DOCUMENTS

| | | | | |
|---|---|---|---|---|
| 6,351,734 B1* | 2/2002 | Lautzenheiser | G06Q 10/06 | 705/7.17 |
| 6,393,410 B1* | 5/2002 | Thompson | G06Q 10/06 | 705/37 |
| 7,039,606 B2* | 5/2006 | Hoffman | G06Q 10/06 | 705/80 |
| 7,330,822 B1* | 2/2008 | Robson | G06Q 10/06 | 705/7.15 |
| 7,610,286 B1* | 10/2009 | Yu | G06F 21/606 | |
| 7,640,548 B1* | 12/2009 | Yu | G06Q 10/10 | 718/106 |
| 7,734,491 B2* | 6/2010 | Kayahara | G06Q 10/06313 | 705/7.23 |
| 7,774,742 B2* | 8/2010 | Gupta | G06F 8/71 | 717/101 |
| 7,801,753 B2* | 9/2010 | Vemula | G06Q 10/0637 | 705/7.24 |
| 7,813,961 B2* | 10/2010 | Wittmer | G06Q 30/0637 | 705/26.82 |
| 8,170,946 B2* | 5/2012 | Blair | G06Q 50/188 | 705/37 |
| 8,386,296 B2* | 2/2013 | Hage | G06Q 30/02 | 700/97 |
| 9,563,404 B2* | 2/2017 | Schwartz | G06Q 10/06311 | |
| 10,317,870 B1* | 6/2019 | Burnett | G05B 19/41805 | |
| 10,395,187 B2* | 8/2019 | Weyl | G06Q 10/06 | |
| 2003/0083918 A1* | 5/2003 | Hoffman | G06Q 10/06 | 705/80 |
| 2003/0172008 A1* | 9/2003 | Hage | G06Q 10/087 | 705/28 |
| 2004/0153376 A1* | 8/2004 | Ganesan | G06Q 10/06 | 705/7.36 |
| 2004/0220819 A1* | 11/2004 | Shetty | G06Q 10/10 | 705/311 |
| 2005/0091143 A1* | 4/2005 | Schmidt | G06Q 30/08 | 705/37 |
| 2005/0197912 A1* | 9/2005 | Wittmer | G06Q 10/0631 | 705/26.8 |
| 2005/0229151 A1* | 10/2005 | Gupta | G06Q 10/06 | 717/101 |
| 2006/0047598 A1* | 3/2006 | Hansen | G06Q 40/00 | 705/37 |
| 2006/0168556 A1* | 7/2006 | Gikas | G06Q 10/06 | 717/104 |
| 2006/0293939 A1* | 12/2006 | Sun | G06Q 10/06 | 705/7.14 |
| 2007/0282660 A1* | 12/2007 | Forth | G06Q 10/10 | 705/7.15 |
| 2007/0283352 A1* | 12/2007 | Degenhardt | G06Q 10/06 | 718/100 |
| 2008/0177565 A1* | 7/2008 | Sun | G06Q 10/06 | 705/7.23 |
| 2009/0204470 A1* | 8/2009 | Weyl | G06Q 10/06 | 705/7.13 |
| 2009/0299822 A1* | 12/2009 | Harari | G06Q 30/0269 | 705/14.66 |
| 2010/0070930 A1* | 3/2010 | Thibault | G06F 16/38 | 715/854 |
| 2011/0082717 A1* | 4/2011 | Saad | G06Q 10/06 | 705/7.13 |
| 2012/0278117 A1* | 11/2012 | Nguyen | G06Q 10/06 | 705/7.15 |
| 2013/0246217 A1* | 9/2013 | Denton | G06Q 30/0206 | 705/26.7 |
| 2014/0067564 A1* | 3/2014 | Yuan | G06Q 30/0641 | 705/16 |
| 2014/0164255 A1* | 6/2014 | Daly | G06Q 50/188 | 705/80 |
| 2014/0278693 A1* | 9/2014 | Zhang | G06Q 10/06313 | 705/7.23 |
| 2015/0120482 A1* | 4/2015 | Kourpas | G06Q 30/0605 | 705/26.2 |
| 2015/0186447 A1* | 7/2015 | Milousheff | G06F 16/278 | 707/694 |
| 2016/0086122 A1* | 3/2016 | Saxena | G06Q 10/06395 | 705/7.39 |
| 2018/0018375 A1* | 1/2018 | Brunel | G06F 16/24554 | |
| 2018/0018383 A1* | 1/2018 | Brunel | G06F 16/2282 | |
| 2018/0114199 A1* | 4/2018 | Sahay | G06F 3/0484 | |
| 2018/0144274 A1* | 5/2018 | Ganesan | G06Q 10/06 | |
| 2018/0197131 A1* | 7/2018 | Grossman | G06Q 10/06316 | |
| 2019/0050786 A1* | 2/2019 | Muser | G06Q 10/06393 | |
| 2020/0020006 A1* | 1/2020 | Kourpas | G06Q 30/0605 | |
| 2020/0057675 A1* | 2/2020 | Dias | G06F 9/48 | |
| 2020/0210943 A1* | 7/2020 | Monovich | G06Q 10/20 | |

* cited by examiner

SPLITTING A TASK HIERARCHY

BACKGROUND

As the complexity of transactions and e-commerce evolves, companies will need to evolve as well. Transactions are increasing completed quickly with entities across the globe. Often, these transactions are performed electronically, without the parties ever meeting in person. As such, companies need to be able to adapt and incorporate e-commerce technology.

SUMMARY

In one aspect, there is provided a system. The system may include at least one data processor and at least one memory. The at least one memory may store instructions that result in operations when executed by the at least one data processor. The operations may include: presenting a first user interface including an object hierarchy comprising a parent node and a plurality of child nodes; receiving, at a second user interface, a first selection allocating at first portion of the object hierarchy to a first device; receiving, at the second user interface, a second selection allocating a second portion of the object hierarchy to a second device; and when a selection at a user interface element of a third user interface is received, sending an indication to a system to enable generation of a fourth user interface presenting a first electronic document for the first device and generation of a fifth user interface presenting a second electronic document for the second device.

In some variations, one or more features disclosed herein including the following features can optionally be included in any feasible combination. The first electronic document and the second electronic document may be published by sending the first electronic document to the first device and sending the second electronic document to the second device. The plurality of child nodes correspond to sub-tasks of the parent node. The object hierarchy may be generated at least in part via the first user interface. The object hierarchy may be generated at least in part via artificial intelligence and/or stored hierarchies stored at the system. The object hierarchy may be split into the plurality of child nodes. The first electronic document may correspond to a first electronic contract, and the second electronic document may correspond to a second electronic contract. An indication may be provided to the system of whether the object hierarchy is to be generated by a machine learning model, a stored hierarchy, and/or user input.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the multiplication of database objects, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A system may be used to provide electronic procurement (e.g., an e-procurement). For example, the e-procurement system may include various events, such as sending a request for information (which requests information from various entities to provide a response regarding their ability to satisfy a procurement), sending a request for proposal or procurement (which requests responsive proposals satisfying a procurement), and sending an award of the procurement. Increasingly, the e-procurement process is becoming complex enabling entities to use e-procurement for a variety of types of procurements from goods to services. The e-procurement process for a service may not be as straight forward as a good. For example, a service may be a complex series of tasks including sub-tasks.

To illustrate further, an e-procurement system may receive a request for industrial maintenance at a plant or other facility. This service line item for industrial maintenance may include a machine service sub-line item, a building cleaning service sub-line item, and an outdoor landscaping service sub-line item. In this example, the machine service sub-line item may further include sub-line items for oil replacement, product degreasing, and/or the like. The building service sub-line item may further include sub-line items for floor cleaning, window cleaning, and/or the like. While the landscaping service sub-line item may further include sub-line items for lawn maintenance, maintenance of sprinklers, fertilizing, and/or the like. The above hierarchy has a form as shown in Table 1 below.

TABLE 1

1. Industrial service line item
   a. machine service sub-line
      i. oil replacement
      ii. product degreasing
   b. a building cleaning service sub-line item
      i. floor cleaning
      ii. window cleaning
   c. an outdoor landscaping service sub-line item
      i. lawn maintenance
      ii. maintenance of sprinklers
      iii. fertilizing The service line item hierarchy and associated complexity may make managing such a hierarchy extremely complex within an e-procurement system. The hierarchy may be in the form of an object hierarchy providing a data structure of parent nodes and one or more layers of child nodes. For example, the e-procurement of a line for a good, such as pens, may be sourced from a single entity. Unlike a good (which is typically awarded to a single entity), it may be more beneficial to source the service line from a plurality of entities. But in an e-procurement system configured to handle goods, the e-procurement system may not be configured to handle splitting of the service line hierarchy containing sub-service lines.

Although the example at Table 1 shows a service line (e.g., a parent node) with 2-sub service lines (e.g., child nodes), the object hierarchy may take other forms as well. For example, the object hierarchy for a single parent node or service line item, such as 1 (Industrial service line item) above, may have more or fewer layers of child nodes or sub-service lines, and include thousands of children child nodes or sub-service items, although other quantities of subservice line items may be realized as well.

In some example embodiments, there may be provided a system, such as an e-procurement system, configured to generate an object hierarchy having a parent node and multiple tiers of child nodes, such as the sub-service lines shown at Table 1 for example. Moreover, the e-procurement system may be configured to enable allowing an entity (or device associated with that entity) to satisfy a portion of the child nodes of the object hierarchy rather than the entire hierarchy associated with the parent node or service line. The portion may be allocated to the entity by at least splitting the object hierarchy, so that some of the child nodes (e.g., subservice line items) are allocated to the entity.

Figure 1:
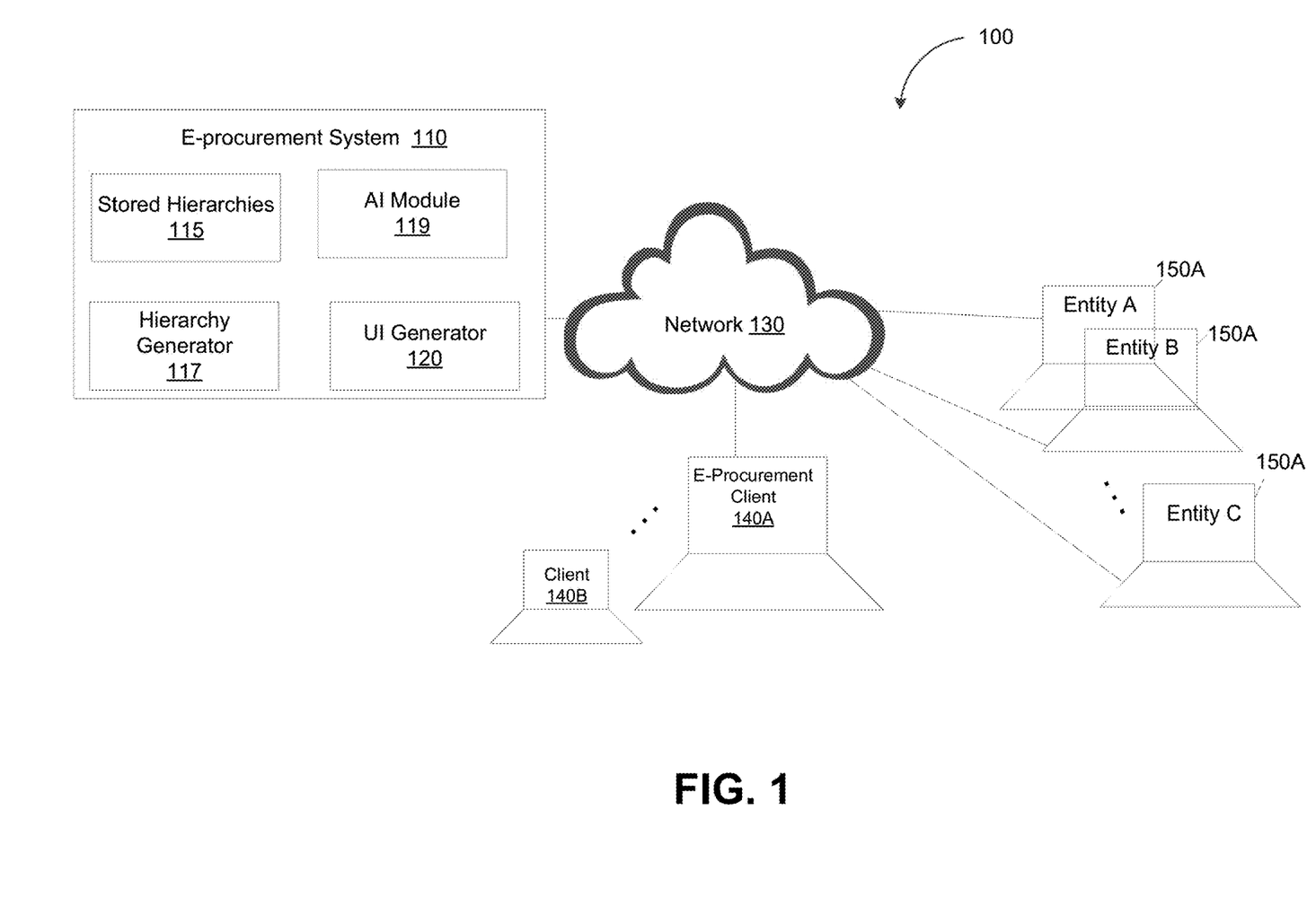
FIG. 1 depicts a system diagram illustrating a system, in accordance with some example embodiments.

FIG. 1 depicts a system diagram illustrating an example of a system 100, in accordance with some example embodiments. Referring to FIG. 1, the system 100 may include an e-procurement system 110, one or more client devices, such as client 140A where the object hierarchy (also referred to herein as a service line hierarchy) may be generated and/or split, and one or more devices associated with other entities 150A-150C which may be awarded a portion of the split hierarchy.

The e-procurement system 110 may comprise at least one processor and at least one memory. For example, the e-procurement system 110 may be implemented as a server, such as a cloud server or other type of server. The e-procurement system 110 may include a stored hierarchy 115, a hierarchy generator 117, an artificial intelligence (AI) module 119, and a UI generator 120.

The stored hierarchy 115 may store hierarchies such as the one shown in Table 1 above. For example, the stored hierarchy 115 may be implemented as a database storing a variety of pre-configured hierarchies. To illustrate further, when a selection is received for a certain type of hierarchy such as industrial service line, the stored hierarchy 115 may return one or more pre-configured hierarchies in response to the request. For example, the e-procurement system may provide a plurality of sub-service items (also referred to herein as child nodes) based on historical information that can be selected via a user interface presented at client 140A. For example, the client 140A may request sub-tasks for an Industrial Maintenance Service, and the e-procurement system 110 may obtain one or more pre-configured sub-service items (including sub-sub service line items) that can be selected for the Industrial Maintenance Service line item. In some implementations, the hierarchy generator 117 may obtain a listing of possible sub-service items for the Industrial Maintenance Service line item, and form one or more candidate hierarchies for selection via a user interface 140A.

The hierarchy generator 117 may, as noted, generate a service line hierarchy, such as the hierarchy depicted at Table 1, from the stored hierarchies. Moreover, the hierarchy generator 117 may propose one or more splits in the hierarchy to enable an entity, such as entity A 150A, to be awarded only a portion of the service line hierarchy. Alternatively or additionally, the splits in the hierarchy may be determined based on responses from entities 150A-150C. For example, if entity 150A indicates (e.g., via a message, such as an email, SMS message, and/or the like) that it seeks to be awarded only a sub-service line item, hierarchy generator 117 may split that portion from the hierarchy. Alternatively or additionally, the splits in the hierarchy may be determined based on information provided by the client 140A. For example, if client 140A may indicate a certain sub-service line item should be split from the other sub-service line items. Alternatively or additionally, the splits in the hierarchy may be determined based on machine-learning information provided by AI module 119. For example, AI module 119 may learn based on historical data from past transactions possible splits in the hierarchy. Moreover, the AI module 119 may learn and indicate if certain sub-service line item should not be split apart but rather grouped.

The AI module 119 may use machine-learning to learn from past information (e.g., prior e-procurements, client preferences, responses from entities, and/or the like) to learn how to generate hierarchies and/or propose splits in the service line hierarchy. The AI module may include a machine-learning model. The machine-learning model may be any type of machine-learning model including, for example, a regression model, an instance-based model, a regularization model, a decision tree, a Bayesian model, a clustering model, an associative model, a neural network, a deep learning model, a dimensionality reduction model, an ensemble model, and/or the like. Moreover, the machine-learning model may be trained to identify possible splits (e.g., one or more sub-service line items that can be awarded separately from the other sub-service line items) in the hierarchy. Alternatively and/or additionally, the machine-learning model may be trained to prevent a sub-service line item from being split. To train the machine-learning model to perform the noted tasks, training data may be provided as an input to machine learning model, such as a neural network or the like. The training data may include historical or reference data indicative of the task or outcome desired, such as acceptable or unacceptable splits in a hierarchy, examples of hierarchies, and/or the like. The training data may thus train (e.g., using conjugate gradient or some other technique) the machine-learning model to provide the outcome desired (e.g., generates a hierarchy, propose splits, prevent a sub-service line item from being split, and/or the like).

The user interface generator 120 may generate the contents for the user interfaces presented at least at client 140A. For example, information for the user interfaces may be generated and provided to the client 140A for presentation, where a user may access client device 140A and make selections and/or interact with the e-procurement system 110.

The one or more client devices 140A-140B may be implemented using at least one processor and at least one memory. For example, the clients 140A-140B may be implemented as a computer, smart phone, tablet, and/or the like. The one or more client devices 140A-140B may include a browser or other program to access and interact with the e-procurement system 110. For example, the client device 140A may present one or more of the user interfaces described below at FIG. 2A-FIG. 2G. The one or more entity devices 150A-150C may be implemented using at least one processor and at least one memory. For example, the entity devices 150A-150C may be implemented as a computer, smart phone, tablet, and/or the like. The entity devices 150A-150C may represent entities that can provide at least a portion of the hierarchy. For example, entity 150A may respond to a request for information, bid on a portion of the hierarchy, and/or be awarded a portion of the hierarchy via the e-procurement system 110 and network 130 (e.g., the Internet, a cellular network, a wireless network, and/or other communication medium).

Figure 2A:
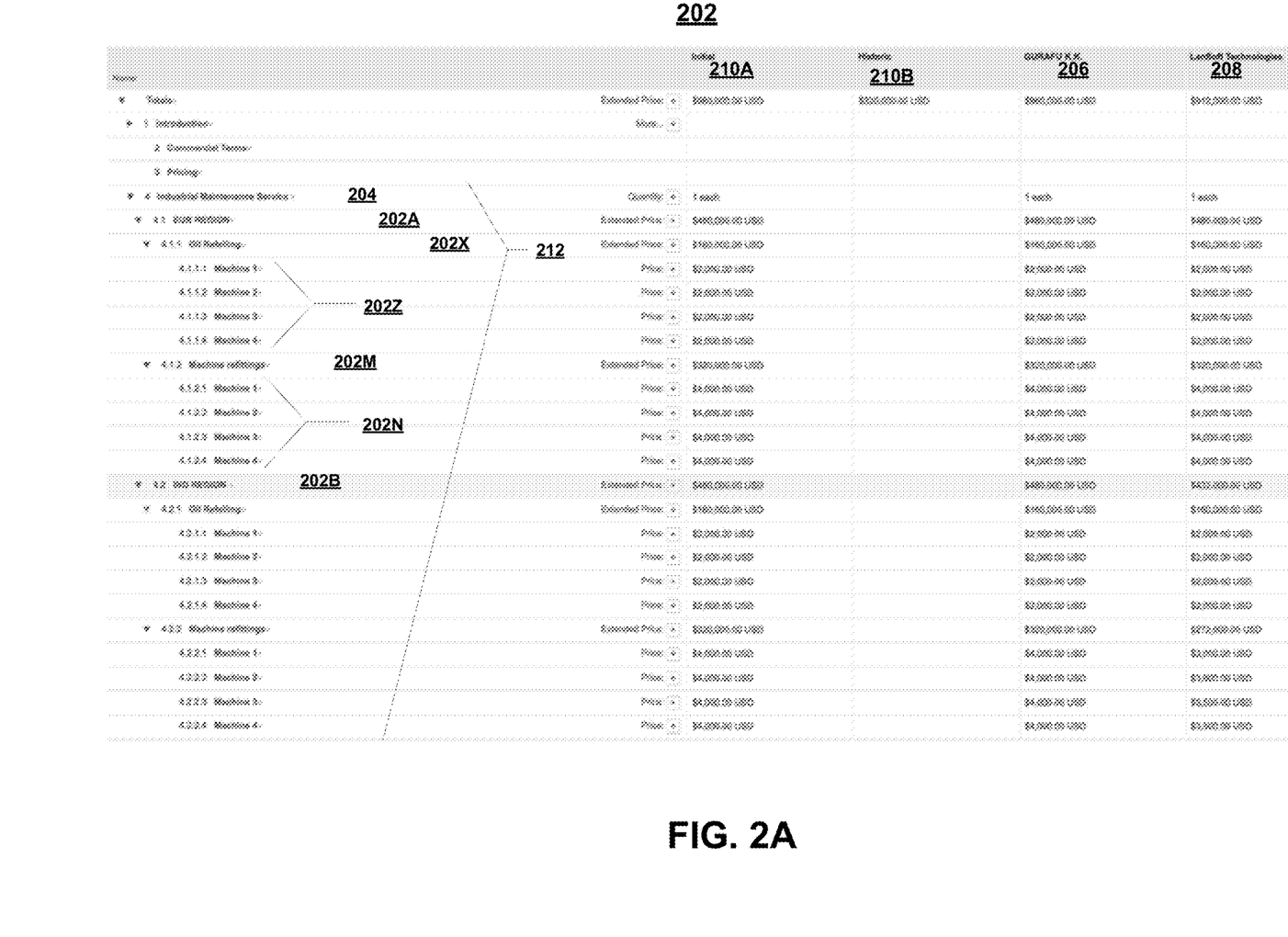
FIG. 2A-FIG. 2G depict examples of user interfaces associated with the system, in accordance with some example embodiments.

FIG. 2A depicts an example of a user interface 202, which may be presented at client device 140A to enable a user at client device 140A to generate and/or view of an object hierarchy, such as the service lines items for an e-procurement handled by the e-procurement system 110.

The user interface 202 includes a variety of lines items including the 4. "Industrial Maintenance Service" line item 204. In this example, the Industrial Maintenance Service line item 204 includes sub-service line item 202A for the "4.1 EUR Region" and sub-service line item 202B for the "4.2 IND Region." Each of the sub-service line items includes dependent sub-service line items (so called sub-sub service line items). For example, the "4.1 EUR Region" 202A sub-service line item includes sub-sub service items "4.1.1 Oil Refueling" 202X and "4.1.2 Machine refittings" 202M, and each of these sub-sub service line items includes additional dependent sub-service items, such as 202Z (which depend, or are children of) Oil Refueling 202X and 202N (which depend, or are children of) Machine Refittings 202M. The hierarchy 212 in this example thus includes three layers, although other layers may be implemented. The layers thus form an object hierarchy including a parent node (e.g., 204) and a plurality of child nodes (e.g., 202A and 202B), and these child nodes may have corresponding child nodes as noted.

The hierarchy 212 may be obtained via stored hierarchies 115 and/or generated at least in part by hierarchy generator 117. For example, a candidate hierarchy may be provided which can include candidate sub-service line items selectable or editable at user interface 202 to form the hierarchy 212. Alternatively or additionally, the hierarchy 212 may be generated in part via user input at user interface 202. Alternatively or additionally, the hierarchy 212 may be generated, as noted, in part based on input provide by the AI module 119.

In the example of FIG. 2A, the user interface 202 includes two possible entities 206 and 208 (which may be located at devices 150A-150B) that can satisfy the line items of the hierarchy 212. These entities 206 and 208 may be determined by the e-procurement system 110 based on responses by those entities, historical information regarding past e-procurements, and/or inputs provided by user interface 202.

The user interface 202 may also include historical (or estimated) information 210B for each line item obtained from previous procurements (or estimated for the current hierarchy 210A by the system 110 and/or provided via the user interface 210A). The user interface 202 may also include an initial cost information 210A for each line item obtained from previous procurements (or estimated for the current hierarchy 212 by the e-procurement system 110 and/or provided via the user interface 210A).

Figure 2B:
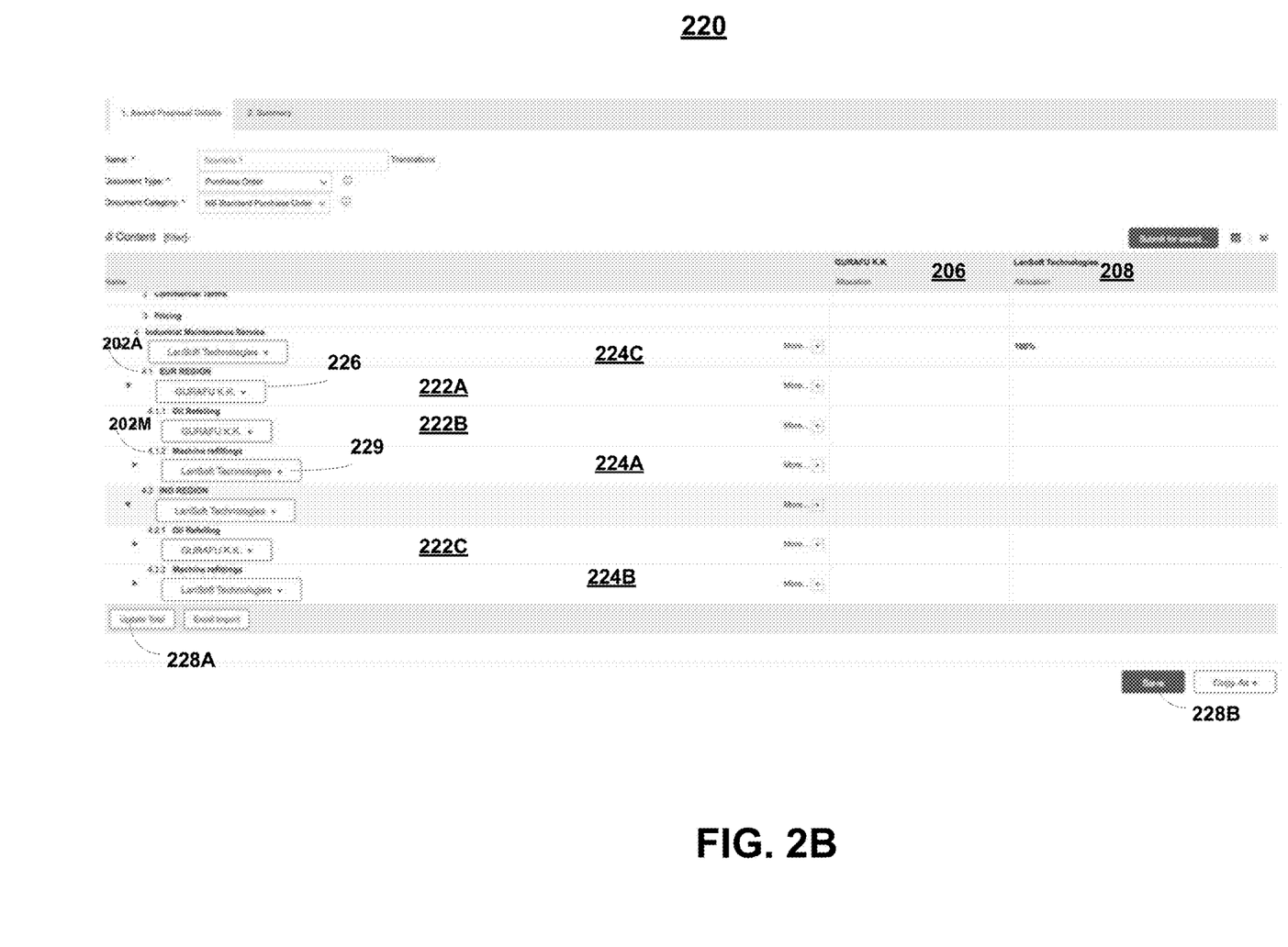

FIG. 2B depicts a user interface 220, which may be presented at for example client device 140A to enable a user at client device 140A to build and/or view the service lines items for an e-procurement handled by the e-procurement system 110. The user interface 220 may be used during the award phase of e-procurement. Referring to the previous example, two entities 206 and 208 have responded by making a proposal to perform the Industrial Maintenance Service 204 line item. In some example embodiments, the split of the hierarchy may, as noted, be performed via a user interface 220. For example, the service line for "4 Industrial Maintenance Service" 222A may be split at each sub-service line by selecting one entity 206 or the other 208 via user interface 220. In the example of FIG. 2B, the hierarchy is split via the user interface so that the first entity 206 (or first device associated with the first entity) is awarded sub-service line items 222A-222C, while the second entity 208 (or second device associated with the second entity) is awarded sub-service line items 224A-224C. In the example, each line item, such as "4 Industrial Maintenance Service," "EUR Region," "Oil Refining," "Machine Refittings," "IND Region," "Oil Refining," and "Machine Refittings" each include a selection mechanism such as a drop down listing the options from which an award of a portion of the hierarchy may be made. For example, selecting drop down 226 may present Gurafu 206 as an entity, LanSoft 208, as an entity, and any other entities that may be selected for an award of the EUR region sub-service line item. When the selections of the entities are completed, a user at client 140A may select 228A or save 228B, which saves the selection at each line, and triggers presentation of user interface 230 at FIG. 2C.

Figure 2C:
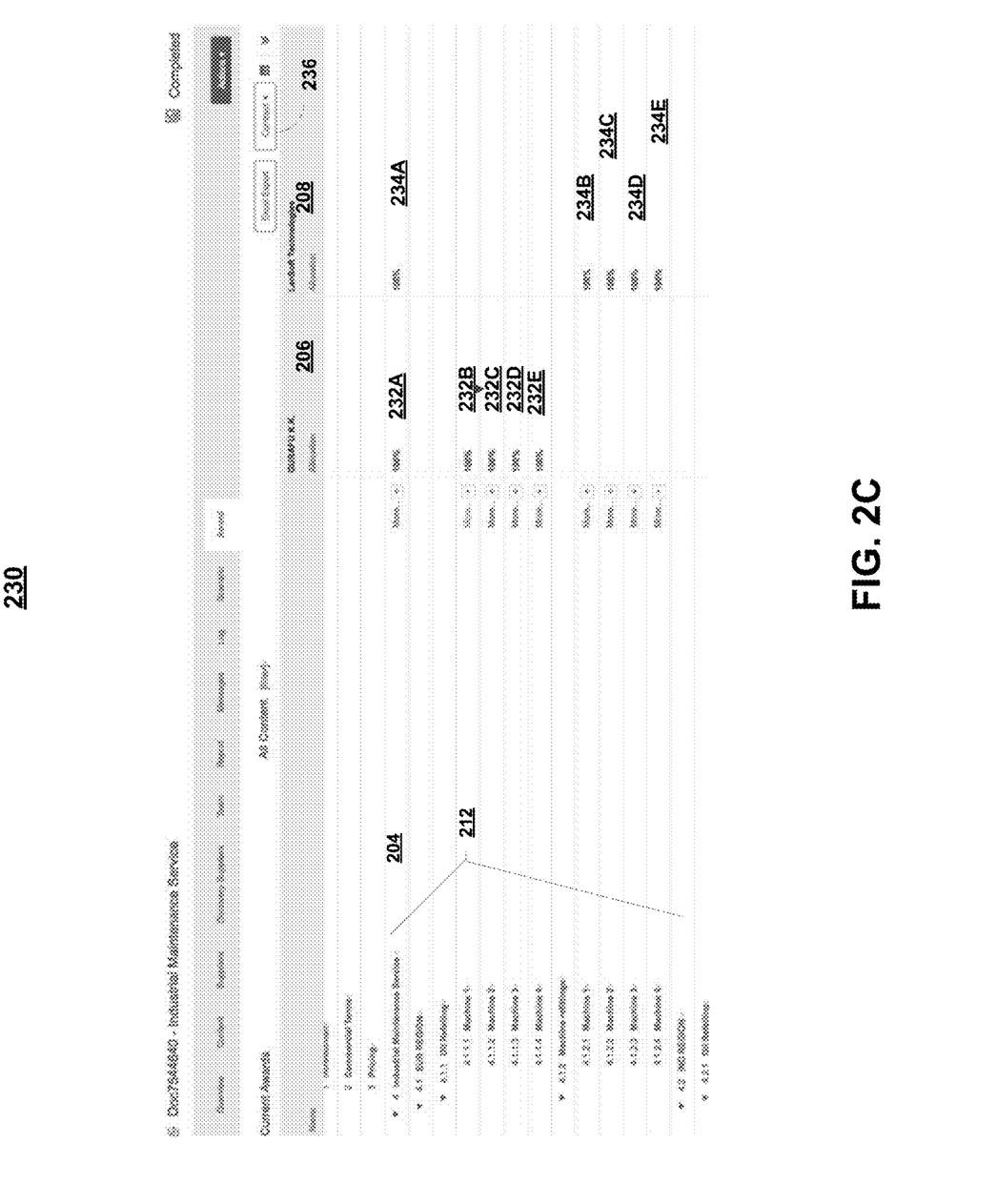

FIG. 2C shows the user interface 230, which may be presented at client 140A. The user interface 230 depicts the split in the hierarchy 212. For example, the Gurafu 206 entity may be slated to be awarded due to the split 232A-232E, while LanSoft 208 may be slated to be awarded 234A-234E. In the example of FIG. 2C, the "4 Industrial Maintenance Service" line item shows a 100% allocation to both Gurafu 206 and LanSoft 208. This enables the e-procurement system 110 to detect that this portion of the line items will be split among more than one entity.

At 230, a contract, such as an electronic contract, may be generated by selecting a user interface element such as 236. This may trigger the generation of the contract for each entity as shown at FIG. 2D-FIG. 2E.

Figure 2D:
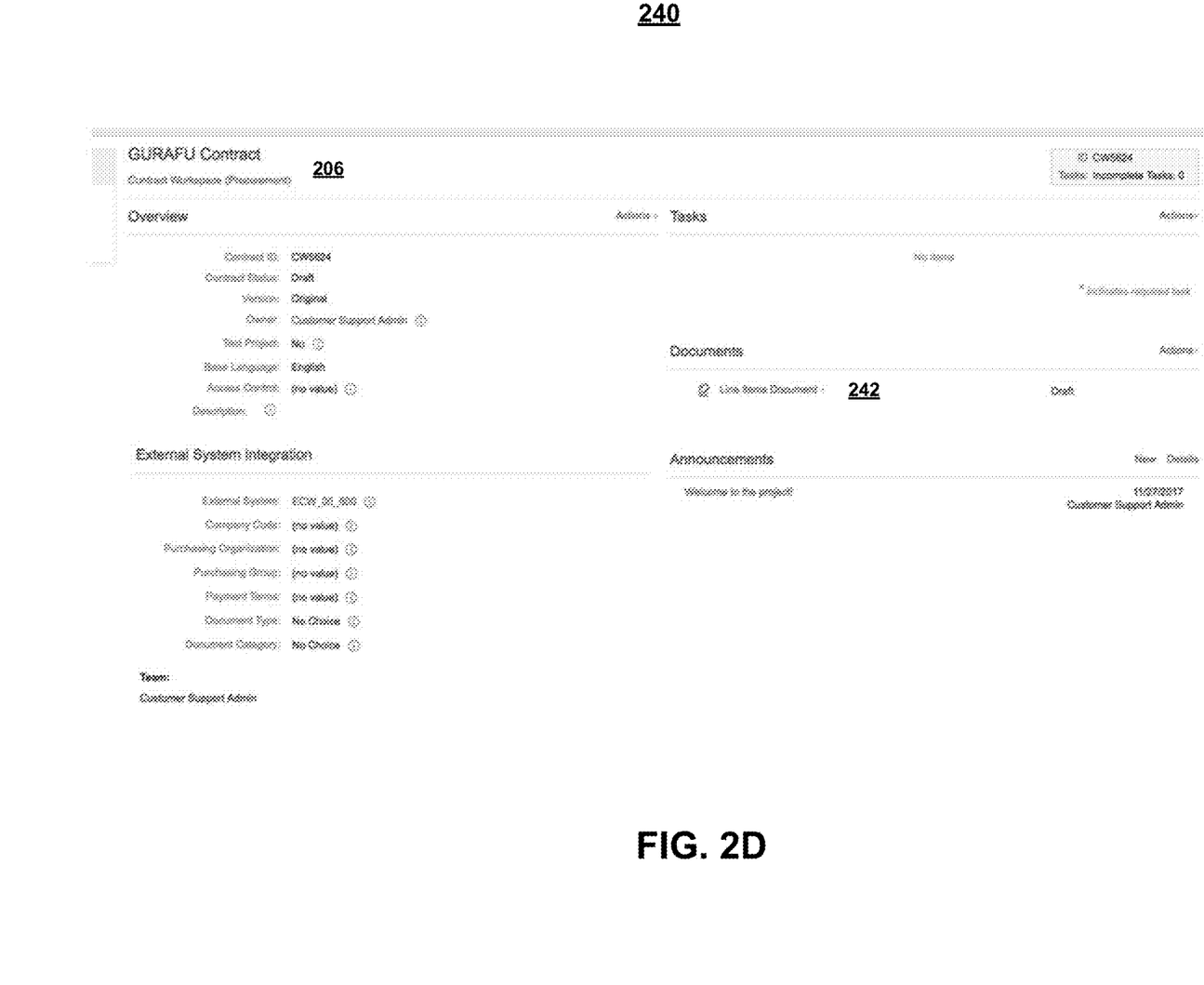
Figure 2E:
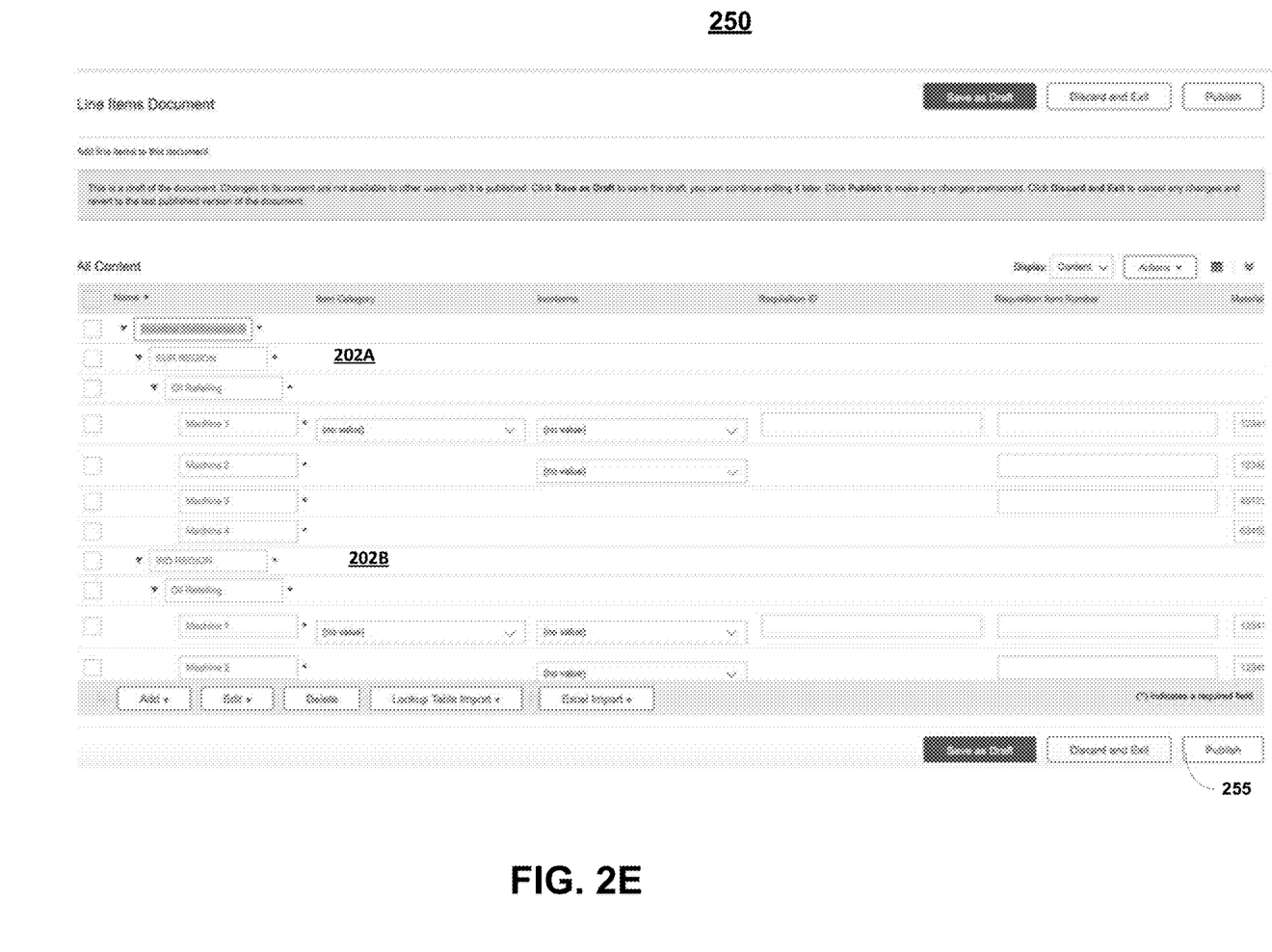

Referring to FIG. 2D, the user interface 240 shows a portion of an e-procurement contract for Gurafu 206, which can be presented to a user at client device 140A and/or transmitted to one of the entity devices 150A, 150B, and/or 150C associated with Gurafu, for example. The user interface 240 also shows the line items 242 for the first entity 206 (Gurafu). In this example, selecting user interface element 242 causes the user interface 250 (FIG. 2E) of line items allocated to the first entity to be presented. In some implementations, the user of the client device may make changes to the contract to the first entity 206 before selecting publish 255, which sends the proposed contract to the first entity 206 (Gurafu) at for example device 150A.

Figure 2F:
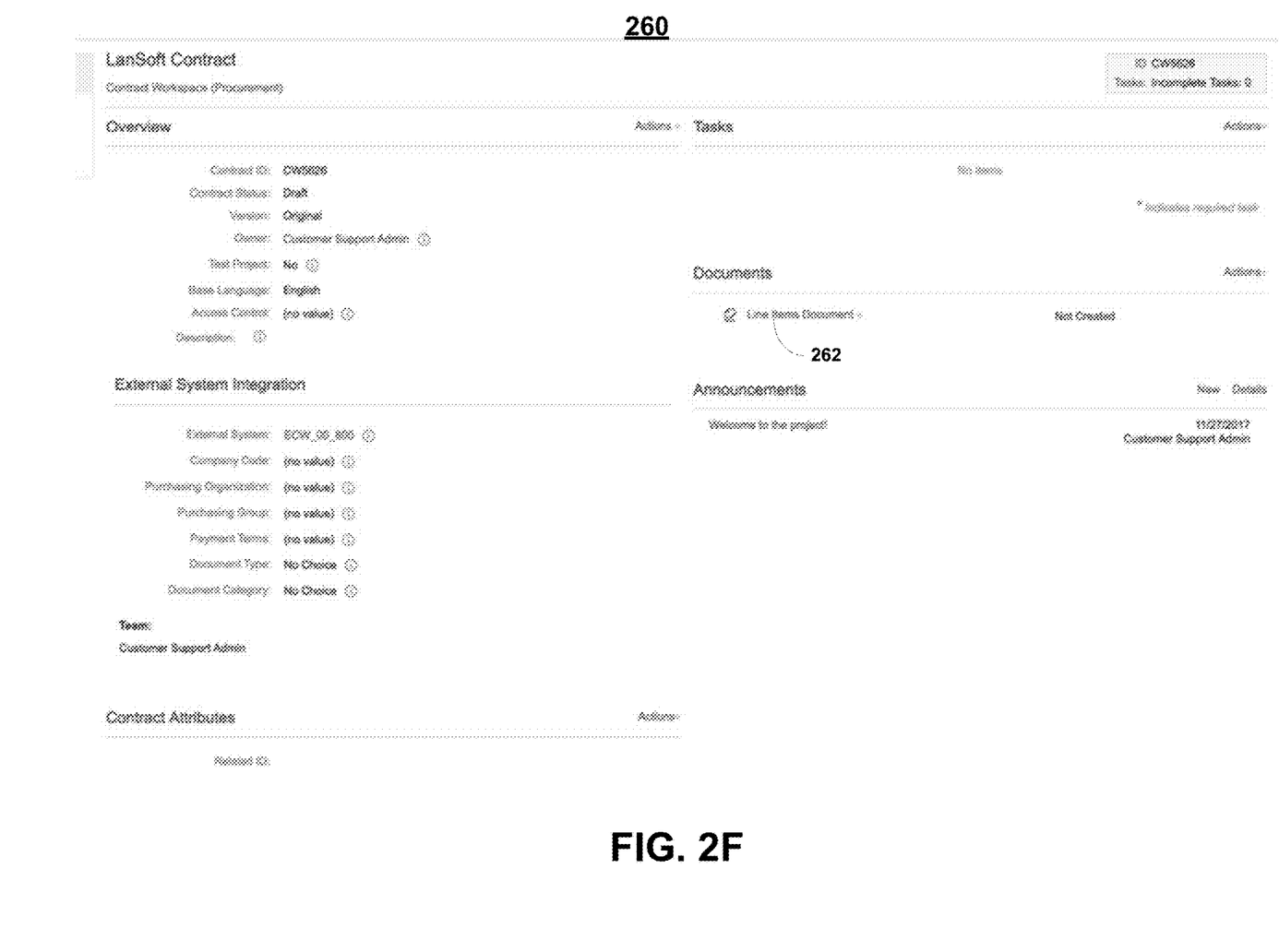

FIG. 2F and FIG. G depicts user interfaces 260 and 270, which are similar to user interface 240 and 250 but for the second entity 208 (Gurafu) are shown and the corresponding split line items.

Figure 2G:
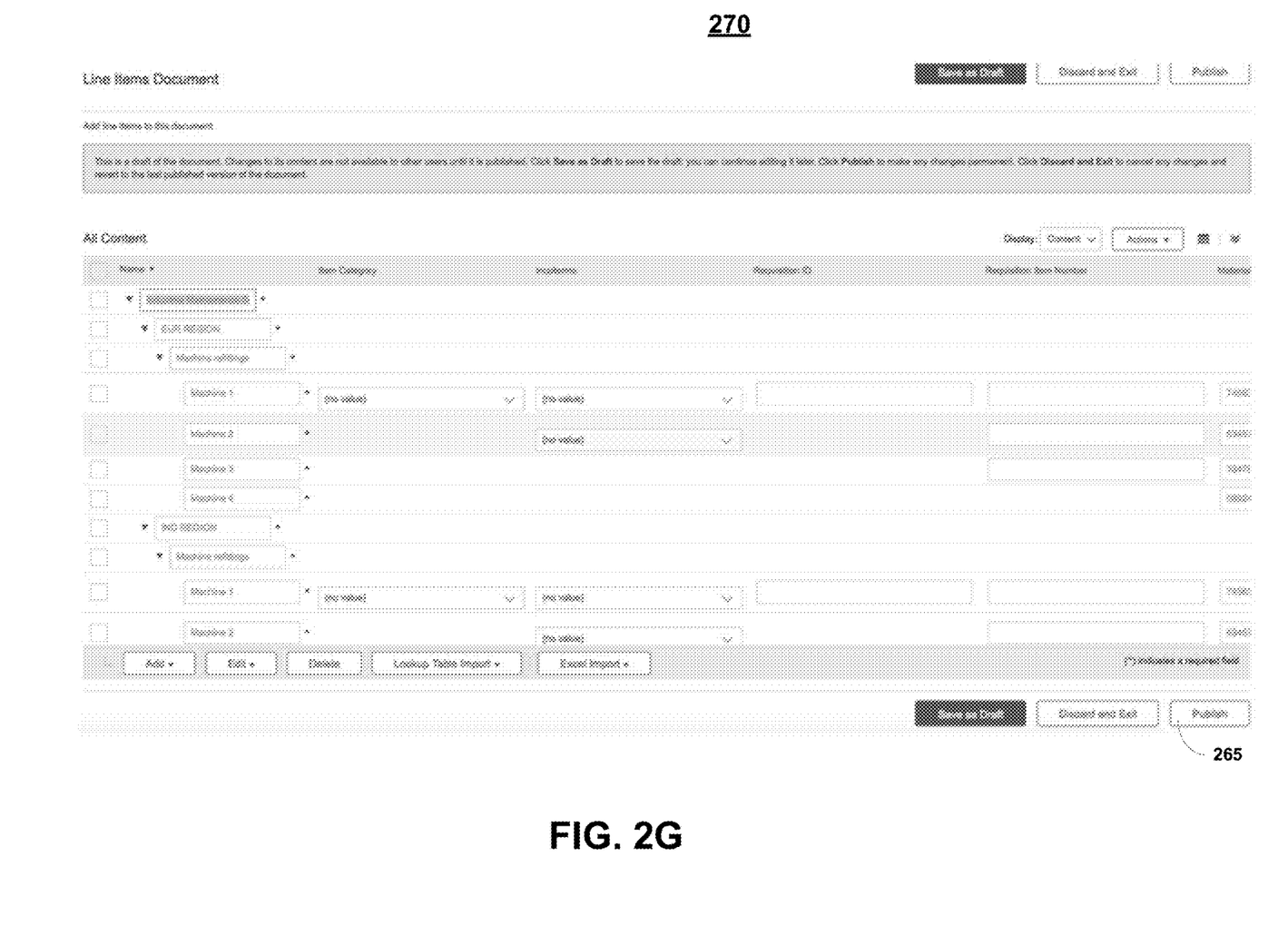
Figure 3:
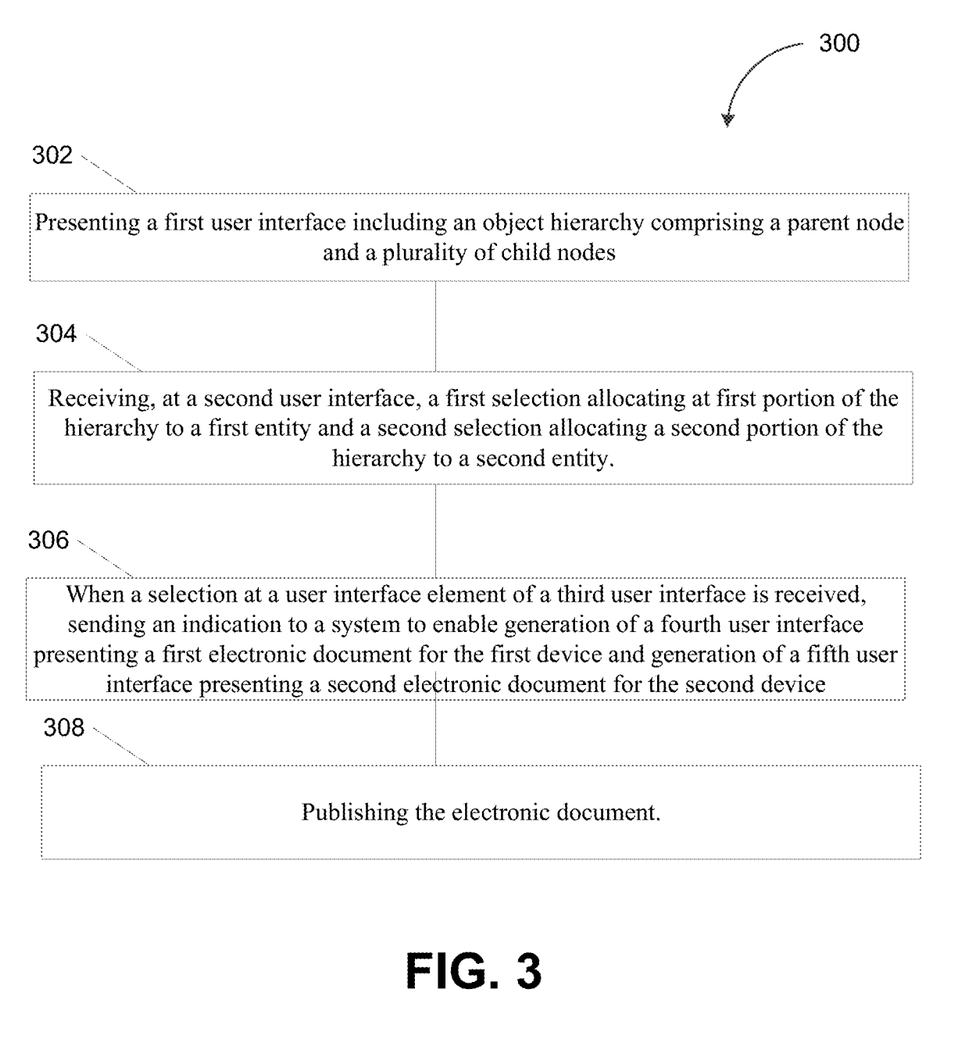
FIG. 3 depicts a process flow associated with the system, in accordance with some example embodiments.

Referring to FIG. 2F-FIG. 2G depicts the user interface 260 and 270 for an e-procurement contract for LanSoft (which in this example is the second entity 208). The user interface may be presented at a client device 140A and/or transmitted to one of the entity devices 150A, 150B, and/or 150C associated with LanSoft, for example. Selection of the user interface element 262 at user interface 260 triggers user interface 270 to be presented at client device 140A. In this example, selecting user interface element 262 causes the user interface 270 of line items allocated to the second entity, LanSoft, to be presented. In some implementations, the user of the client device may make changes to the contract to the second entity before selecting publish 265, which sends the proposed contract to the second entity 208 (LanSoft) at for example device 150B FIG. 3 depicts an example process for splitting a hierarchy of nodes comprising a parent node and a plurality of child nodes representing sub-tasks of the parent node (e.g., a service line node). The description of FIG. 3 also refers to FIG. 1 and FIG. 2A-FIG. 2G.

At 302, presenting a first user interface including an object hierarchy, such as a data structure including a parent node (e.g., a parent service line) and a plurality of child nodes (e.g., child service lines). Referring to FIG. 2A for example, the user interface 202 may present an object hierarchy, such as hierarchy 212. This hierarchy 212 may include a parent node, such as service line 204, and a plurality of child nodes, such as the sub-service lines 202A, 202B, as well as their corresponding sub-service lines 202X, 212Z, 202M, 202N, and so forth. As noted above, the hierarchy 212 may be generated at least in part via the user interface 202, the hierarchy generator 117, the stored hierarchies 115, and/or the AI module 119.

At 304, receiving, at a second user interface, a first selection allocating at first portion of the hierarchy to a first entity and a second selection allocating a second portion of the hierarchy to a second entity. Referring to FIG. 2B for example, a first selection may be received, and this first selection may correspond to a selection of, for example, entity 206 (Gurafu) at the user interface element 226. This selection allocates a portion of the hierarchy, such as the child service line item 202A, to the entity 206. A second selection may be received, and this second selection may correspond to a selection of, for example, entity 208 (LanSoft) at the user interface element 229. This selection allocates a portion of the hierarchy, such as the child service line item 202M, to the entity 208. Additional allocations may be made via the user interface. The allocations may be saved by selecting 228B and/or viewed as a summary at user interface 230.

At 306, when a selection at a user interface element, such as element 236 (FIG. 2C) is received, this may trigger the e-procurement system to generate an additional user interfaces presenting e-contracts for each entity. For example, the e-contract for the first entity (e.g., Gurafu) may be presented via one or more user interfaces, such as user interface 240-250. These user interfaces may show which portions of the allocations are assigned to the first entity. Likewise, the e-contract for the second entity (e.g., LanSoft) may be presented via one or more user interfaces, such as user interface 250-260. These user interfaces may show which portions of the allocations are assigned to the first entity.

At 308, the e-contracts may be published. For example, the e-commerce system 110 may publish the e-contracts for the first entity, such as Gurafu 206, by sending the e-contract information to entity device 150A associated with Gurafu. And, the e-commerce system 110 may publish the e-contracts for the second entity, such as LanSoft 208, by sending the e-contract information to entity device 150B associated with LanSoft. Each entity 206 and/or 208 may respond by accepting, rejection, or acknowledging receipt of the e-contract by sending a message to e-procurement system 110A via network 130.

In some example embodiments, the generated hierarchy may be generated by the system, such as the e-procurement system. But the client 140A may indicate (e.g., via a selection at a user interface at 140A) to the system 110 whether the object hierarchy, such as the object hierarchy, is generated based on a machine learning model, a stored hierarchy, and/or user input, such as selection of a portion of a hierarchy. In this way, greater client control of the generation is provided.

Figure 4:
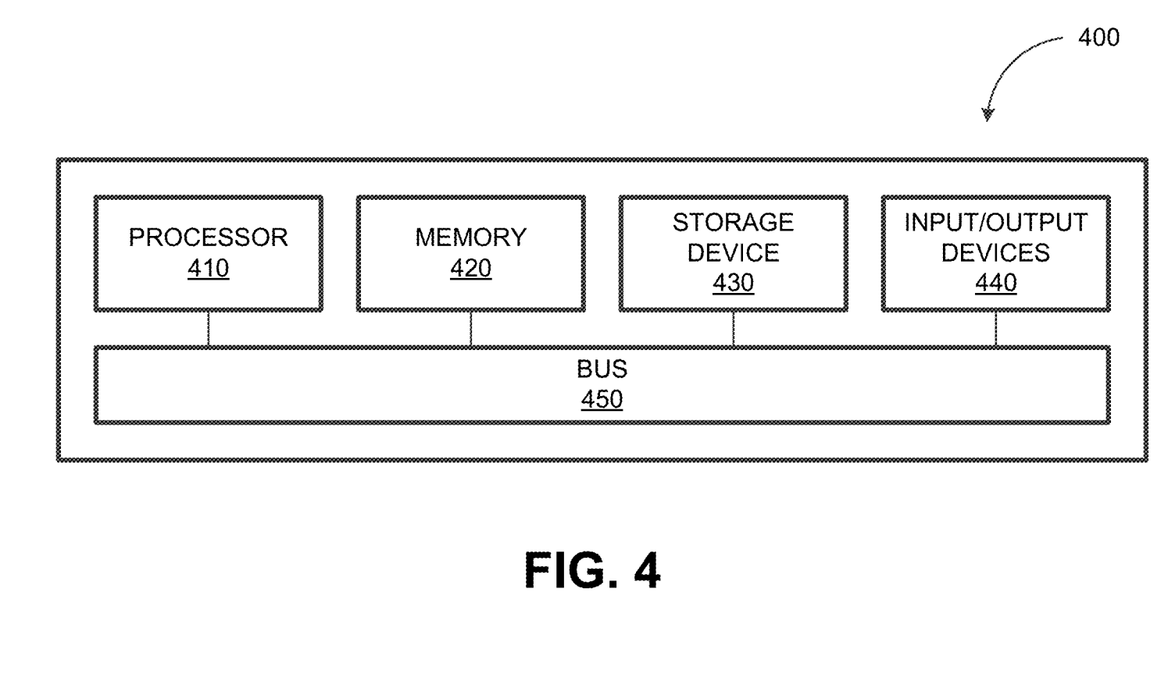
FIG. 4 depicts a block diagram illustrating a computing system, in accordance with some example embodiments.

FIG. 4 depicts a block diagram illustrating a computing system 400 consistent with implementations of the current subject matter. Referring to FIG. 1 and FIG. 4, the computing system 400 can be used to implement the database management system 110 and/or any components therein.

As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the e-procurement system 110. In some example embodiments, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store instructions and/or other data associated with the processes disclosed herein. The storage device 430 is capable of providing persistent storage for the computing system 400. The storage device 430 can be a floppy disk device, a hard disk device, an optical disk device, a tape device, or other suitable persistent storage means. The input/output device 440 provides input/output operations for the computing system 400. In some example embodiments, the input/output device 440 includes a keyboard and/or pointing device. In various implementations, the input/output device 440 includes a display unit for displaying graphical user interfaces.

According to some example embodiments, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some example embodiments, the computing system 400 can be used to execute various interactive computer software applications that can be used for organization, analysis and/or storage of data in various formats. Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, cause operations comprising:
      presenting a first user interface including an object hierarchy comprising a parent node and a plurality of child nodes, wherein the parent node represents a service being procured via an electronic procurement system and the plurality of child nodes each represent tasks of the service being procured via an electronic procurement system, wherein the object hierarchy includes at least one proposed split in the child nodes, the at least one proposed split generated by a machine learning model at the electronic procurement system, wherein the machine learning model is trained to identify possible splits in tasks that can be separated in an electronic procurement of the service;

receiving, at a second user interface, a first selection allocating a first portion of the child nodes of the object hierarchy to a first device associated with a first entity, the allocating in accordance with the at least one proposed split generated by the machine learning model, wherein the machine learning model comprises a neural network trained, based on reference data representative of acceptable splits and unacceptable splits, to generate the at least one proposed split;

receiving, at the second user interface, a second selection allocating a second portion of the child nodes of the object hierarchy to a second device associated with a second entity, the allocating in accordance with the at least one proposed split generated by the machine learning model;

receiving an indication of a third selection at the second user interface;

in response to the third selection at the second user interface, presenting a third user interface including the first portion of the child nodes allocated to the first device associated with the first entity and further including the second portion of the child nodes allocated to the second device associated with the second entity;

when a selection at a user interface element of the third user interface is received, sending an indication to enable generation of a fourth user interface presenting a first electronic document for the first device associated with the first entity being allocated the first portion and generation of a fifth user interface presenting a second electronic document for the second device associated with the second entity being allocated the second portion; and publishing the first electronic document and the second electronic document by sending the first electronic document to the first device and sending the second electronic document to the second device, wherein the first electronic document corresponds to a first electronic contract, and wherein the second electronic document corresponds to a second electronic contract.

2. The system of claim 1, wherein the plurality of child nodes include at least one sub-task.

3. The system of claim 1, wherein the object hierarchy is generated at least in part via the first user interface.

4. The system of claim 1, wherein the object hierarchy is generated at least in part via stored hierarchies stored at the system.

5. The system of claim 1 further comprising:
providing, to the system, another indication of whether the object hierarchy is to be generated by the machine learning model, a stored hierarchy, and/or user input.

6. The system of claim 1 comprising or comprised in the electronic procurement system including an electronic procurement client device at which the first user interface and the second user interface are presented, wherein the first device and the second device couple to the electronic procurement system via a network.

7. The system of claim 6, wherein the machine learning model generates a plurality of proposed split which are selectable, via the second interface, for allocation.

8. A method comprising:
presenting a first user interface including an object hierarchy comprising a parent node and a plurality of child nodes, wherein the parent node represents a service being procured via an electronic procurement system and the plurality of child nodes each represent tasks of the service being procured via an electronic procurement system, wherein the object hierarchy includes at least one proposed split in the child nodes, the at least one proposed split generated by a machine learning model at the electronic procurement system, wherein the machine learning model is trained to identify possible splits in tasks that can be separated in an electronic procurement of the service;

receiving, at a second user interface, a first selection allocating a first portion of the child nodes of the object hierarchy to a first device associated with a first entity, the allocating in accordance with the at least one proposed split generated by the machine learning model, wherein the machine learning model comprises a neural network trained, based on reference data representative of acceptable splits and unacceptable splits, to generate the at least one proposed split;

receiving, at the second user interface, a second selection allocating a second portion of the child nodes of the object hierarchy to a second device associated with a second entity, the allocating in accordance with the at least one proposed split generated by the machine learning model;

receiving an indication of a third selection at the second user interface;

in response to the third selection at the second user interface, presenting a third user interface including the first portion of the child nodes allocated to the first device associated with the first entity and further including the second portion of the child nodes allocated to the second device associated with the second entity;

when a selection at a user interface element of the third user interface is received, sending an indication to enable generation of a fourth user interface presenting a first electronic document for the first device associated with the first entity being allocated the first portion and generation of a fifth user interface presenting a second electronic document for the second device associated with the second entity being allocated the second portion; and publishing the first electronic document and the second electronic document by sending the first electronic document to the first device and sending the second electronic document to the second device, wherein the first electronic document corresponds to a first electronic contract, and wherein the second electronic document corresponds to a second electronic contract.

9. The method of claim 8, wherein the plurality of child nodes include at least one sub-task.

10. The method of claim 8, wherein the object hierarchy is generated at least in part via the first user interface.

11. The method of claim 8, wherein the object hierarchy is generated at least in part via stored hierarchies stored at the system.

12. The method of claim 8 further comprising:
providing, to the system, another indication of whether the object hierarchy is to be generated by the machine learning model, a stored hierarchy, and/or user input.

13. A non-transitory computer-readable storage medium including instruction which when executed by at least one processor causes operations comprising:
presenting a first user interface including an object hierarchy comprising a parent node and a plurality of child nodes, wherein the parent node represents a service being procured via an electronic procurement system and the plurality of child nodes each represent tasks of the service being procured via an electronic procurement system, wherein the object hierarchy includes at least one proposed split in the child nodes, the at least one proposed split generated by a machine learning model at the electronic procurement system, wherein the machine learning model is trained to identify possible splits in tasks that can be separated in an electronic procurement of the service;
receiving, at a second user interface, a first selection allocating a first portion of the child nodes of the object hierarchy to a first device associated with a first entity, the allocating in accordance with the at least one proposed split generated by the machine learning model, wherein the machine learning model comprises a neural network trained, based on reference data representative of acceptable splits and unacceptable splits, to generate the at least one proposed split;
receiving, at the second user interface, a second selection allocating a second portion of the child nodes of the object hierarchy to a second device associated with a second entity, the allocating in accordance with the at least one proposed split generated by the machine learning model;
receiving an indication of a third selection at the second user interface;
in response to the third selection at the second user interface, presenting a third user interface including the first portion of the child nodes allocated to the first device associated with the first entity and further including the second portion of the child nodes allocated to the second device associated with the second entity;
when a selection at a user interface element of the third user interface is received, sending an indication to enable generation of a fourth user interface presenting a first electronic document for the first device associated with the first entity being allocated the first portion and generation of a fifth user interface presenting a second electronic document for the second device associated with the second entity being allocated the second portion; and
publishing the first electronic document and the second electronic document by sending the first electronic document to the first device and sending the second electronic document to the second device, wherein the first electronic document corresponds to a first electronic contract, and wherein the second electronic document corresponds to a second electronic contract.

14. The non-transitory computer-readable storage medium of claim 13, wherein the plurality of child nodes include at least one sub-task.

15. The non-transitory computer-readable storage medium of claim 13, wherein the object hierarchy is generated at least in part via the first user interface.

\* \* \* \* \*